United States Patent
Sandhu et al.

(10) Patent No.: US 8,457,674 B2
(45) Date of Patent: Jun. 4, 2013

(54) ARCHITECTURE, PROTOCOLS AND FRAME FORMATS FOR WIRELESS MULTI-HOP RELAY NETWORKS

(75) Inventors: Sumeet Sandhu, Santa Clara, CA (US); Ozgur Oyman, Palo Alto, CA (US)

(73) Assignee: Intel Corporation, Santa Clara, CA (US)

(*) Notice: Subject to any disclaimer, the term of this patent is extended or adjusted under 35 U.S.C. 154(b) by 911 days.

(21) Appl. No.: 11/529,982

(22) Filed: Sep. 29, 2006

(65) Prior Publication Data
US 2008/0080436 A1 Apr. 3, 2008

(51) Int. Cl.
| | |
|---|---|
| H04L 5/22 | (2006.01) |
| H04W 4/00 | (2009.01) |
| H04W 36/00 | (2009.01) |
| H04W 40/00 | (2009.01) |
| H04J 3/00 | (2006.01) |
| H04B 3/36 | (2006.01) |
| H04B 7/14 | (2006.01) |
| H04B 1/60 | (2006.01) |
| H04B 17/02 | (2006.01) |
| H04B 7/15 | (2006.01) |
| H04B 7/00 | (2006.01) |

(52) U.S. Cl.
USPC ........... 455/522; 370/300; 370/332; 370/338; 370/476; 455/7; 455/10; 455/11.1; 455/444; 455/445; 455/524; 455/525

(58) Field of Classification Search
USPC .............. 455/7, 10, 11.1, 13.4, 445, 522
See application file for complete search history.

(56) References Cited

U.S. PATENT DOCUMENTS

| | | | |
|---|---|---|---|
| 6,748,222 B1* | 6/2004 | Hashem et al. | 455/453 |
| 6,879,574 B2 | 4/2005 | Naghian | |
| 6,973,308 B1* | 12/2005 | Smith | 455/436 |
| 6,996,086 B2 | 2/2006 | Wolfe | |
| 2002/0028675 A1* | 3/2002 | Schmutz et al. | 455/424 |
| 2002/0111183 A1* | 8/2002 | Lundby | 455/522 |
| 2005/0113106 A1* | 5/2005 | Duan et al. | 455/452.2 |
| 2006/0281483 A1* | 12/2006 | Kroon et al. | 455/522 |
| 2007/0010271 A1* | 1/2007 | Roy | 455/517 |
| 2008/0049672 A1* | 2/2008 | Barak et al. | 370/330 |

FOREIGN PATENT DOCUMENTS

| | | |
|---|---|---|
| EP | 1734665 | 6/2005 |
| JP | 2003-124876 | 4/2003 |
| KR | 10-2006-0101802 A | 9/2006 |
| WO | 2004107693 | 12/2004 |
| WO | 2008/042192 A1 | 4/2008 |

OTHER PUBLICATIONS

International Search Report and Written Opinion for PCT/US2007/020799 mailed Feb. 20, 2008, 10 pages.
International Preliminary Report on Patentability for PCT Application No. PCT/US2007/020799, mailed Apr. 9, 2009, 6 pages.
Ozgur Oyman, "Routing in Wireless Mesh Networks", U.S. Appl. No. 11/318,206, filed Dec. 23, 2005.
Office Action Received for Chinese Patent Application No. 200780035851.8, mailed on Jan. 20, 2011, 13 pages of Chinese Office Action including 8 pages of English Translation.
Office Action received for Japanese Patent Application No. 2009-524712, mailed Dec. 18, 2012, 5 pages English translation.

* cited by examiner

Primary Examiner — Vladimir Magloire
Assistant Examiner — Edd Rianne Plata
(74) Attorney, Agent, or Firm — Kacvinsky Daisak PLLC (57) ABSTRACT

Methods, protocols and systems for communicating in a multi-hop wireless mesh network may include explicitly providing information relating to backhaul wireless link qualities in multi-hop wireless mesh network to next generation subscriber stations in a first mode. In a second mode, embodiments are configured to implicitly provide indicia of multi-hop wireless link qualities to legacy subscriber stations by adjusting a transmit power of frames sent to the legacy subscriber stations. Other embodiments and variations are described in the detailed description.

20 Claims, 5 Drawing Sheets

ARCHITECTURE, PROTOCOLS AND FRAME FORMATS FOR WIRELESS MULTI-HOP RELAY NETWORKS

BACKGROUND OF THE INVENTION

It is becoming increasingly attractive to use wireless nodes in a wireless network as relaying points to extend range and/or reduce costs of a wireless network. For example, in a wireless wide area network (WWAN) or wireless metropolitan area network (WMAN) that requires deployment of distributed base stations across large areas, the base stations need to be connected to a core network and/or each other via some type of backhaul. In conventional cellular networks, the backhaul has typically consisted of wired connections. However, a wireless backhaul, rather than, or in some combination with, a wired backhaul is increasingly being considered to ease deployment and reduce costs associated with these networks.

A type of network which uses wireless stations (fixed infrastructure and/or mobile stations) to relay signals between a source and destination is colloquially referred to herein as a mesh network. While some attempt to distinguish the term "mesh network" and "mobile multi-hop relay (MMR) network" by virtue that the former may use fixed and/or mobile stations as relaying points and the latter may use only fixed infrastructure relay stations, they are not necessarily so distinguished and may in fact be interchangeably used herein without limiting the scope of the inventive embodiments.

In mesh networks, wireless network nodes may form a "mesh" of paths for which a communication may travel to reach its destination. The use of a multi-hop wireless mesh network and how to optimize communications through a mesh network have become the subject of much focus and there are ongoing efforts to increase the efficiency of transmissions through multi-hop wireless mesh networks. One notable issue is how to coordinate the selection of optimal transmission paths using new protocols and architectures for mesh networking as well as maintaining backward compatibility with non-mesh legacy wireless devices.

BRIEF DESCRIPTION OF THE DRAWING

Aspects, features and advantages of embodiments of the present invention will become apparent from the following description of the invention in reference to the appended drawing in which like numerals denote like elements and in which.

DETAILED DESCRIPTION OF THE INVENTION

While the following detailed description may describe example embodiments of the present invention in relation to WMANs, the inventive embodiments are not limited thereto and can be applied to other types of wireless networks where similar advantages may be obtained. Such networks for which inventive embodiments may be applicable specifically include, wireless personal area networks (WPANs), wireless local area networks (WLANs), WWANs such as cellular networks and/or combinations of any of these networks.

The following inventive embodiments may be used in a variety of applications including transmitters and receivers of a radio system. Radio systems specifically included within the scope of the present invention include, but are not limited to, network interface cards (NICs), network adaptors, mobile stations, base stations, access points (APs), hybrid coordinators (HCs), gateways, bridges, hubs and routers. Further, the radio systems within the scope of the invention may include cellular radiotelephone systems, satellite systems, personal communication systems (PCS), two-way radio systems and two-way pagers as well as computing devices including radio systems such as personal computers (PCs) and related peripherals, personal digital assistants (PDAs), personal computing accessories and all existing and future arising systems which may be related in nature and to which the principles of the inventive embodiments could be suitably applied.

Wireless multi-hop relay systems are the focus of several current standardization efforts. For example, for WLANs the Institute of Electrical and Electronics Engineers (IEEE) 802.11s Mesh Task Group (TG) is actively working on standard solutions for WLAN mesh networking. Additionally, the IEEE 802.16j Mobile Multi-hop Relay (MMR) task group is also evaluating solutions for standardization in furtherance of the IEEE 802.16j project approval request (PAR) (Approved: Mar. 30, 2006) for wireless broadband access (WBA) networks.

The initial scope of the 802.16j MMR is expected to be restricted to infrastructure relay stations. These relay stations will be used to extend the coverage of IEEE 802.16e base stations without impacting the mobile device or subscriber station (SS) specifications. (IEEE 802.16e is the former reference for mobile BWA solutions which are now standardized under the IEEE 802.16-2005 amendment). The MMR relay stations are intended to be fully backward compatible in the sense that they should operate seamlessly with existing 802.16e subscriber stations (SS) which were never designed for optimizing communications in a mesh network. A second phase of 802.16j (which may be implemented using another standard reference) is expected to introduce enhanced relay and WBA subscriber stations designed for used in MMR networks. This second phase however may not be backward compatible with legacy 802.16e subscribers. While the embodiments discussed herein may refer to 802.16 wireless broadband access networks, sometimes referred to as WiMAX, an acronym that stands for Worldwide Interoperability for Microwave Access, which is a certification mark for products that pass conformity and interoperability tests for the IEEE 802.16 standards, they are not so limited and may be applicable to WLAN, other types of mesh networks or even combinations of different networks.

Figure 1:
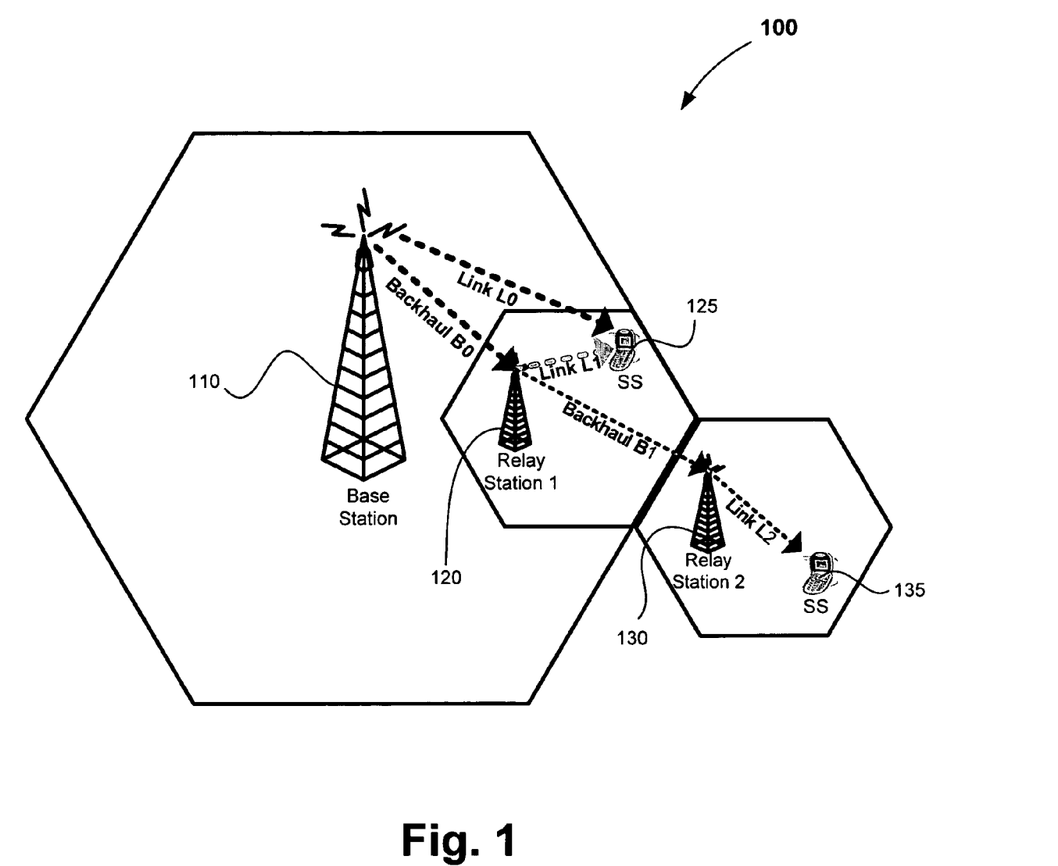
FIG. 1 is a block diagram illustrating an arrangement of wireless nodes for a macro cell in an example wireless mesh network according to various embodiments of the present invention.

Turning to FIG. 1, a wireless mesh network 100 according to various embodiments may be any system having devices capable of transmitting and/or receiving information via at least some over-the-air (OTA) radio frequency (RF) links. For example in one embodiment, network 100 may include a plurality of wireless nodes 110-135 (and other undesignated nodes) to wirelessly communicate or relay messages. The hexagons shown in FIG. 1 are intended to generally represent a spatial or "cellular" range for radio link coverage of a base station or relay node in a region of nodes that form mesh network 100.

In certain embodiments, the wireless nodes 110-135 in network 100 may be devices which communicate using wireless protocols and/or techniques compatible with one or more of the Institute of Electrical and Electronics Engineers (IEEE) various 802 wireless standards including for example, 802.11 (a), (b), (g), (n) and/or (s) standards for WLANs, 802.15 standards for WPANs, and/or 802.16 standards for WMANs, although the inventive embodiments are not limited in this respect.

In certain non-limiting example implementations of the inventive embodiments, one or more of nodes in network 100 (e.g., node 110) may be a wireless transceiver that is connected to a core network, such as an Internet protocol (IP) network, via a physical wired connection (e.g., electrical or fiber optic connection). This type of station is referred to herein as a "macro base station" or simply "base station" (BS) where the term may be used herein to generically refer to any type of centralized network access station such as a base station, an access point, hybrid coordinator, wireless router, or other device. Additionally, in certain embodiments, one or more of nodes (e.g., nodes 120 and 130) in network 100 may be wireless transceivers that are not connected to a core network by electrical or wires or optical cables but rather use a wireless backhaul as mentioned previously. These types of relay stations (RS) may be fixed radio relay nodes which are sometimes referred to as "micro" or "pico" base stations (depending on the size of their coverage area), although the inventive embodiments are not limited in this respect. Hereinafter, these types of unwired relay nodes are generically referred to as relay stations (RS).

Typically, the transmit power and antenna heights of the wireless transceivers in relay stations are less than that for a macro base station. Further, multi-hop wireless network 100 may be comprised of several macro cells, each of which may generally comprise at least one macro base station similar to station 110 and a plurality of relay stations (e.g., 120, 130) dispersed throughout each macro cell and working in combination with the macro base station(s) to provide a full range of coverage to client stations 125, 135, generically referred to herein as subscriber stations. In certain embodiments of wireless mesh network 100, relay stations 120, 130 may facilitate connectivity to each other and/or to macro base stations and/ or or subscriber stations 125, 135 via wireless links using protocols compatible with one or more of the Institute of Electrical and Electronics Engineers (IEEE) various 802.16 and/or 802.11 standards although the inventive embodiments are not limited in this respect.

To this end, according to the various embodiments herein, the wireless nodes in network 100 may be configured to communicate using orthogonal frequency division multiple access (OFDMA) protocols. OFDMA is also referred to as multi-user orthogonal frequency division multiplexing (OFDM). In OFDM, a single transmitter transmits a carrier comprised of many different orthogonal (independent) frequencies (called subcarriers or tones) which may each be independently modulated according to a desired modulation scheme (e.g., quadrature amplitude modulation (QAM) or phase-shift keying (PSK)). OFDMA is adapted for multiple users generally by assigning subsets of subcarriers and/or time slots of subcarriers to individual users or nodes in the network. There are various types of OFDM and/or OFDMA schemes, e.g., scalable OFDMA and/or flash OFDMA, which may be utilized by the inventive embodiments as suitably desired. Moreover, OTA protocols other than OFDM or OFDMA may be used with the inventive embodiments as suitable desired.

In one example implementation, a WiMAX multi-hop wireless mesh relay deployment, depicted in FIG. 1, may include relay stations 120, 130 which are added to increase the footprint of base station 110 to improve range and coverage at the cell-edge. This may allow a subscriber station 125 at the cell-edge to choose to connect directly to base station 110, e.g., over link L0, or via RS 120 via links B0 and L1, where B0 is the backhaul between base station 110 and relay station 120. For a subscriber station 135 further away, there may be multiple backhaul hops, e.g., links B0 and B1 from base station 110 to subscriber station 135 across multiple relays stations e.g., 120, 130, in between. Upon waking up or moving from one cell to another, it must be decided whether a subscriber station 125, 135 should associate with base station 110 directly or whether to associate with a relay station 120, 130.

For the purposes of this disclosure, it is assumed that relay stations 120, 130 may have capabilities very similar to base station 110, i.e., they can perform association authentication, time/frequency resource allocation, etc., perhaps with some control from base station 110 via the backhaul although the embodiments are not limited in this manner as relay stations 120, 130 may not be intelligent but may simply amplify and forward communications. Using the foregoing assumption, for legacy subscribers, relay stations 120 or 130 may appear as a base station and may provide fully backward-compatible functionalities. In this case, the backhaul link(s) B0 and/or B1 between base station 110 and a relay station 120 and/or 130 can largely be concealed from the legacy subscriber station, except in certain cases discussed in detail herein.

Questions addressed by the inventive embodiments may therefore include: (i) how can a subscriber station execute performance-optimal network entry and handoff; and (ii) what mechanisms may be used at the relay stations to support both legacy subscribers and next-generation subscribers? In addressing these questions, the present inventors propose that in one embodiment, a relay station may be able to provide explicit and implicit information to allow a subscriber station to make a judicious decision for network entry or handoff. By way of example, if changes to frame or packet formats are permitted for next-generation mesh subscriber stations, then information may be provided explicitly by including certain information to assist in making these decisions in the frame(s). However, in order to maintain backward compatibility with legacy subscribers, in which frame or packet formats are already established, this information somehow must be provided implicitly.

Accordingly, in various embodiments, methods for network entry and/or handoff are proposed which may include two general modes of operation: (i) a backward compatible mode which may support legacy wireless subscriber stations; and (ii) an optimal mode which supports subscriber stations designed specifically to use new protocols developed specifically for addressing optimization of communication paths in multi-hop relay wireless mesh networks. Further, methods for network entry and/or handoff proposed herein may attempt to optimize end-to-end performance for both legacy and next-generation subscriber stations.

There are two principal types of deployments for multi-hop wireless mesh networks which may impact the manner in which mesh optimization (i.e., selection of an optimal or near optimal wireless path for communications between network nodes) is suitably performed. A first type of deployment is referred to as a "big-stick" suburban deployment in which base station 110 is located at heights greater than 40 meters and relay stations 120, 130 are located at heights of 10-20 meters or higher. At such heights, generally above residential rooftops, the OTA channels for backhaul links B0 and B1 between base station 110 and relay stations 120, 130 are generally line-of-sight (LOS) connections, particularly in relatively flat terrain. In this type of deployment, backhaul links B0 and B1 are thus relatively stable and end-to-end performance may not be significantly adversely affected over time. This allows the opportunity to essentially ignore the backhaul link performance of a multi-hop path and thus communication optimization may largely be based on the quality of the last hop, i.e., the channel quality directly between a subscriber station and one or more relay or base stations.

In the suburban deployment, a legacy subscriber station may connect with a relay station essentially the same as if it were a base station. And, without knowing the difference, network entry or handoff may be performed by either a legacy or next-generation subscriber station simply by selecting the most appropriate network access station (i.e., base station or relay station) for association using metrics of available direct links (e.g., L0, L1, L2) used in legacy 802.16e or 802.11 systems. That is, network entry or handoff may be performed by analyzing a received signal strength indicator (RSSI), signal-to-noise ratio (SNR), channel capacity, etc., which may be determined by either legacy subscriber stations or next-generation mesh subscriber station without requiring any change to existing packet or frame formats.

The second type of network deployment is a dense urban deployment in which the channels, and thus quality of the backhaul links B0, B1, between base station 110 and relay stations 120, 130 may be severely faded and/or shadowed by taller buildings or other structures. This may also be true for hilly terrains where hills and trees may significantly attenuate signals between base station 110 and relay stations 120, 130. Additionally, time-varying in-band interference, which is more likely experienced in dense urban areas, may degrade the quality of backhaul links B1 and B0, especially in network environments utilizing unlicensed frequency bands. As a result, the end-to-end performance of a multi-hop mesh network becomes sensitive to the quality of backhaul links B1 and B0. In order to select the optimal base station or relay station to associate with, a subscriber should have access to an end-to-end performance metric which quantifies the performance of a combination of backhaul and direct links.

While a subscriber can easily measure the direct link performance per existing standards, there is currently no way to know the combined performance of various backhaul links such as B0 and B0-B1. Thus quality metrics for these links should be advertised by relays stations 120 and 130 in a decentralized multi-hop architecture or by base station 110 in a centralized architecture. Furthermore, even in suburban deployments, if the network utilizes a large number of inexpensive non-intelligent relay stations, due to potential large numbers these "dumb" relays being deployed for redundancy, the end-to-end performance may significantly dependent on the quality of intermediate hops.

Figure 2:
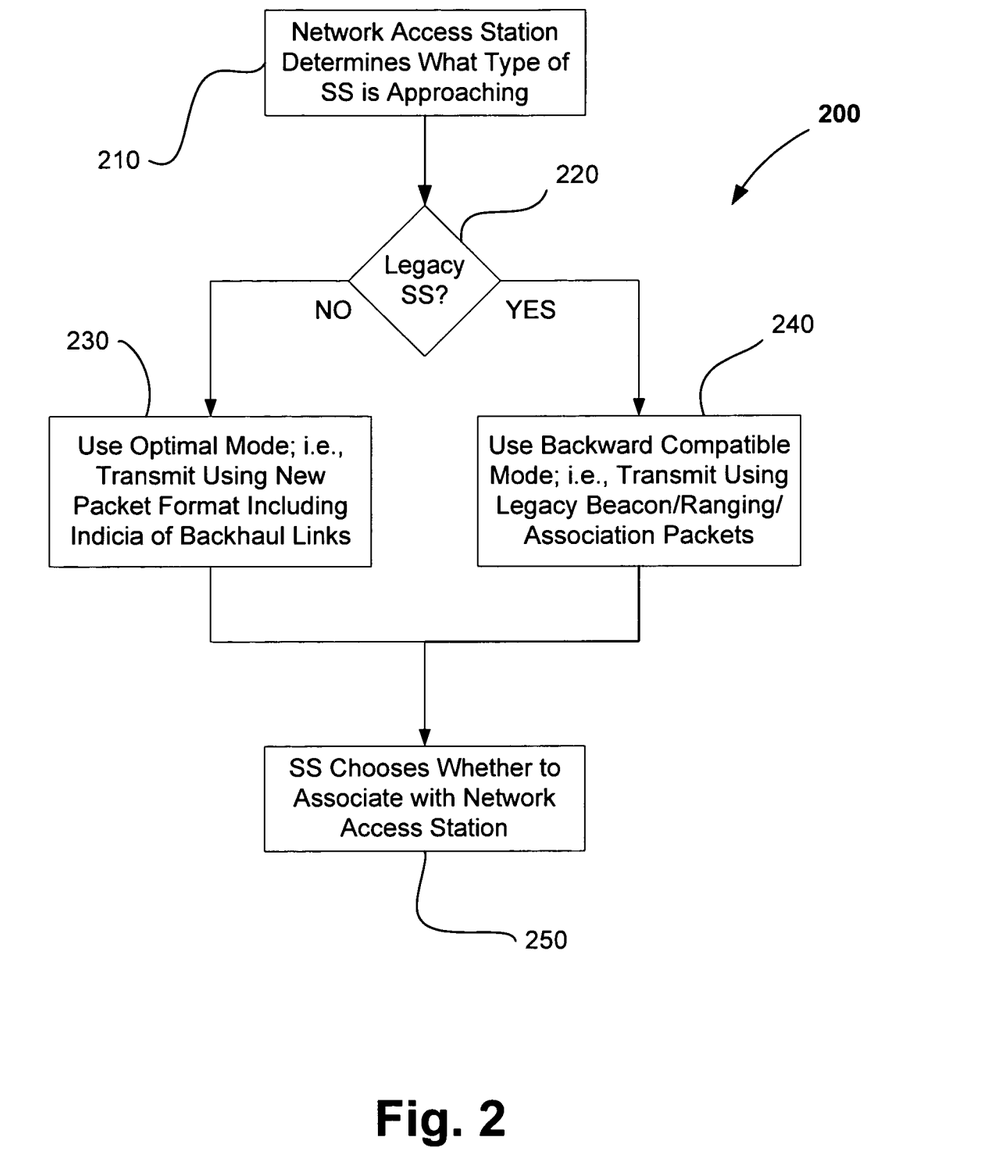
FIG. 2 is a flow chart showing a wireless mesh communication method for explicitly conveying multi-hop link information according to one embodiment of the present invention.

In one example embodiment, referring to FIG. 2, an explicit method 200 for communicating in a wireless mesh network may generally begin by a network access station (such as relay stations 120, 130 in FIG. 1) determining 210 what type of subscriber station (SS) is approaching for network entry or handoff. If 220 it is determined that the approaching subscriber station is a next-generation device capable of handling new frame or packet formats designed for wireless mesh optimization capabilities, the network access station may begin transmitting 230 to the approaching subscriber station using its optimal mode. If 220, on the other hand, the approaching subscriber station is determined to be a legacy device (e.g., and IEEE 802.16e or IEEE 802.11g device) which was not designed to handle packet or frame formats with indicia of mesh backhaul performance, the network access station will begin transmitting 240 to the approaching subscriber station using its backward compatible mode.

According to various embodiments transmitting 230 using the optimal mode may include sending beacon, ranging or association frames having a format which includes additional information elements (IEs) to provide an indication of the backhaul link quality for the network access station as discussed with respect to FIG. 3 below. In the backward compatible mode, the network access station may simply transmit 240 beacon, ranging or association frames having a legacy format (e.g., not including any IEs regarding the network access station backhaul link(s) quality).

Based on the frames transmitted 230, 240 by the network access station, the approaching subscriber station may choose 250 whether to associate with the network access station. For example, next generation subscriber stations may realize the end-to-end performance for connecting with the network access station by measuring the direct link channel quality and considering the backhaul link quality indicated by the IEs in one or more received frames. This may be compared with the end-to-end link performance available via association with a different network access station (e.g., base station or relay station) to decide which is the optimal network access station the subscriber station should associate with. Using the explicit method 200, legacy subscriber stations may be limited to choosing 250 based on last hop link quality.

Figure 3:
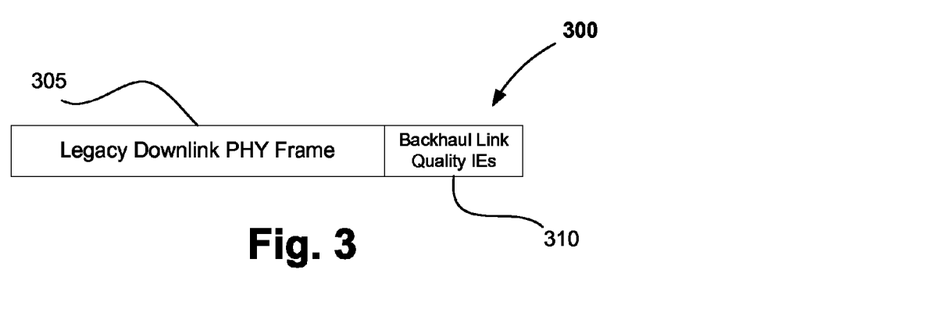
FIG. 3 is a diagram of an example frame or packet format for explicit conveyance of multi-hop wireless mesh link quality information.

FIG. 3 is a non-limiting example of a potential MMR frame format 300 which may be used for the optimal mode referred to above. In this illustrative example, frame 300 is an example of a physical layer (PHY) frame which may include a legacy frame portion 305 that includes information and/or a format compatible with legacy standards such as IEEE 802.16e or 802.11a, b, g or n. Frame 300 may also include an extended portion 310 which may be used to carry information elements (IEs) regarding the overall backhaul link quality for a relay station. While not necessary for the inventive embodiments, if legacy frame portion 305 precedes extended portion 310, the same frame format may be used for all approaching subscribers to the end that legacy subscriber stations simply ignore, since they are not designed to recognize, extended portion 310. Therefore, depending on the network environment, all frames transmitted 230, 240 by the network access station may be the same and thus method 200 may not in fact have to determine 210 what type of subscriber station is approaching or transmit 230 or 240 different frame formats.

In the explicit method 200, new generation subscriber stations that may comprehend the backhaul quality link information 310 (FIG. 3) in frame 300 may enjoy benefits of enhanced end-to-end performance in such deployments. For example, consider the uplink situation in FIG. 1 where subscriber station 125 wishes to enter or handoff in network 100 at the highest possible throughput. A new generation subscriber station may use an algorithm similar to equation 1 to determine whether to connect to relay station 120 or base station 110 using the explicit method 200 of FIG. 2:

$$C_1 > \frac{1}{\frac{1}{C_2} + \frac{1}{C_3}}; \quad \text{(Eq. 1)}$$

where $C_1$ is the measured supportable throughput over link L0 between BS 110 and SS 125, $C_2$ is the throughput over link L1 between RS 120 and SS 125, and $C_3$ is the throughput over backhaul link B0 between BS 110 and RS 120. In this non-limiting example, $C_1$, $C_2$ and $C_3$ are functions of instantaneous signal-to-noise ratios (SNRs) over these links, which are a function of fast fading, shadowing and path-loss, and may vary over time depending on the mobility of SS 125 or the environment. If the inequality of equation (1) is true, then SS 125 connects directly to BS 110 over link L0. If the inequality is false, the SS 125 connects to RS 120 and the two-hop link B0-L1 is used.

However, using this approach, where $C_3$ is conveyed by virtue of the new packet frame structure (e.g., 310 in FIG. 3), legacy subscribers would still be limited to network entry or handoff determinations based on the last hop link performance (e.g., $C_1 > C_2$ or $SNR_1 > SNR_2$) and thus may not enjoy the same performance improvements as new generation multi-hop relay wireless mesh subscriber stations that use new packet/frame structures.

Figure 4:
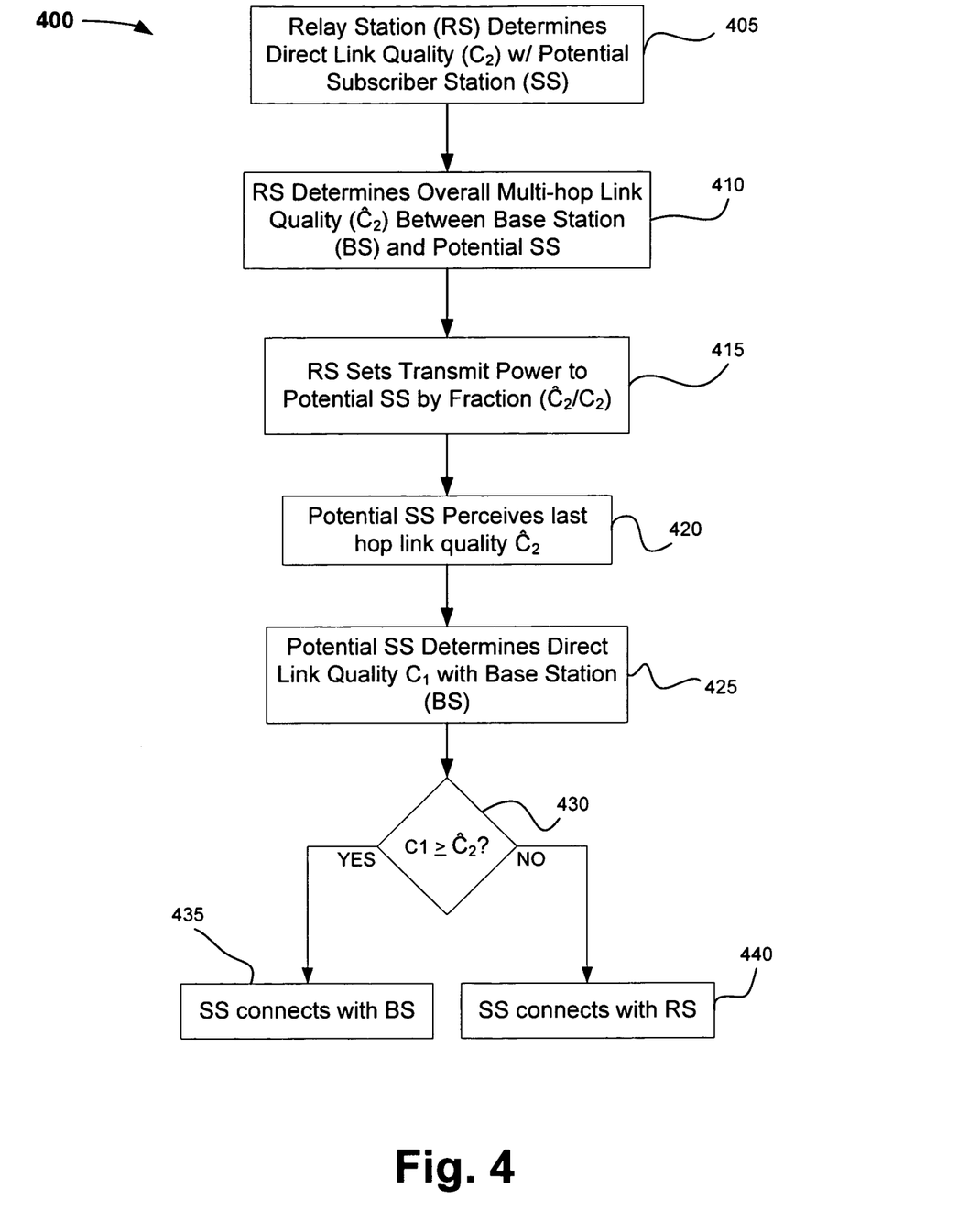
FIG. 4 is a flow diagram of showing a wireless mesh communication method for implicitly conveying multi-hop link information according to another embodiment of the present invention.

Accordingly, referring to FIG. 4, an implicit method 400 to enable legacy subscribers to determine optimal network entry or handoff based on overall end-to-end multi-hop link quality may be based on "tricking" legacy subscribers that the quality ($C_2$) of the last hop, e.g., the link (L1) between SS 125 and RS 120 in FIG. 1, is different than what its capability actually is. Although method 400 is described in the context of allowing legacy subscriber stations to choose network stations to associate with that have an optimal throughput to a network node or core network, there is nothing which would limit method 400 for use by only legacy subscribers and in fact, all subscriber stations, new generation and legacy, might use the same technique for mesh optimization during network entry or handoff. Alternatively, method 400 may be combined with method 200 of FIG. 2, e.g., at step 240, in a manner that provides all subscriber stations with some signaling to assist in choosing an optimal or near optimal connection point in a multi-hop wireless mesh network.

In method 400, the relay station (RS) may convey backhaul link quality to subscriber stations in an implicit fashion, without requiring any modifications to packet format. To ensure that a subscriber station performs network entry in a throughput-optimal fashion, while ensuring backward compatibility we may define the condition:

$$C_1 > \hat{C}_2 \text{ or } SNR_1 > \hat{SNR}_2 \quad \text{(Eq. 2)}$$

where $\hat{C}_2$ and $\hat{SNR}_2$ are the effective throughput and effective SNR for the multi-hop link (e.g., the two hop link involving the BS-RS (B0) and RS-SS (L1) links in FIG. 1). If 420 the inequality in equation (2) is true, the SS connects 435 directly to the BS or other network access station for which the link quality $C_1$ defines. Otherwise the SS connects 440 to the RS. The network entry or handoff for a subscriber station based on this condition may be realized through power control at the RS terminal. For example, when the RS advertises itself as a potential receiver to the SS, it may set 415 its transmit power by a fraction of $\hat{SNR}_2/SNR_2$, which ensures that the cost of conveying packets over the wireless backhaul link B0 is taken into account. One potential definition of $\hat{C}_2$ and $\hat{SNR}_2$ can be made as follows:

$$\hat{C}_2 = \frac{1}{\frac{1}{C_2} + \frac{1}{C_3}} \text{ and } \hat{SNR}_2 = 2^{\hat{C}_2} - 1 \quad \text{(Eq. 3)}$$

where $\hat{C}_2$ and $\hat{SNR}_2$ are related to each other by Shannon's capacity formula although the embodiments are not limited in this manner. Note that under this definition of $\hat{C}_2$ and $\hat{SNR}_2$ the RS must possess the knowledge of the channel qualities over both BS-RS (B0) and RS-SS (L1) links, so that it can compute $\hat{C}_2$ or $\hat{SNR}_2$ and reduce 415 its power by $\hat{C}_2/C_2$ or $\hat{SNR}_2/SNR_2$. To this end, method 400 may include a relay station determining 405 the link quality ($C_2$ or $SNR_2$) between itself and the subscriber station as well as determining 410 the overall end-to-end multi-hop link quality $\hat{C}_2$ or $\hat{SNR}_2$ between the potential subscriber station via itself, including any backhaul links to a base station. Finally, it should be noted that if the quality of the wireless backhaul link, e.g., B0 in FIG. 1, is much better than the RS-SS link L1 (i.e., $C_3 \gg C_2$), then $\hat{C}_2 \approx C_2$ and $\hat{SNR}_2/SNR_2 \rightarrow 1$, indicating that the quality of the last hop (e.g., link L1) is all that is relevant in determining the optimal network station for the subscriber station to associate with.

According to various embodiments, in order to implicitly convey the effective end-to-end capacity $\hat{C}_2$ to the subscriber station, the relay station can employ several "tricks" including controlling transmit power 415 during ranging or controlling transmit power 415 for beaconing/preamble/association packets.

For example, during ranging downlink transmissions, the RS may lower its transmit power to a value corresponding to equation (3). Subsequently, the RS can go back to full transmit power after the subscriber has successfully associated and prior to a normal data exchange session begins.

Figure 5:
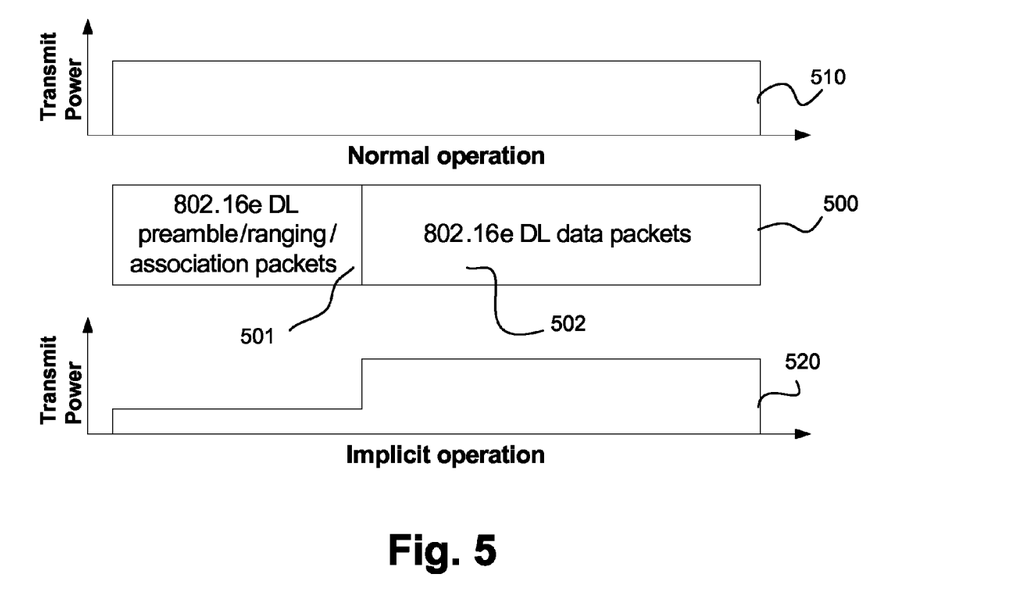
FIG. 5 is a power level transmission diagram for a multi-hop wireless mesh node according to various embodiments.

An example illustration of this power control technique is shown in FIG. 5 where downlink (DL) frames/packets 500 are to be transmitted by a network access station such as a base station or relay station. During normal operation such as in a legacy 802.16e modes, packets 500 may be transmitted at the relay station's normal transmit power level for the duration that any packets are being transmitted as shown by the transmit power level 510. However, for implicitly conveying information regarding the multi-hop link quality of the relay station backhaul, the same or similar packets 500 may be sent using a reduced transmit power. As shown in the example power level plot 510, in certain embodiments, only the preamble, ranging and/or association packets 501 are sent at a reduced power level to convince an approaching subscriber station the overall link with the relay station is not as good as it appears to be, but rather is lower due to the quality of the backhaul links. If the potential subscriber station decides to connect with the relay station (e.g., 440; FIG. 4), the relay station may return to normal power levels for transmission of future packets such as data packets 502.

Figure 6:
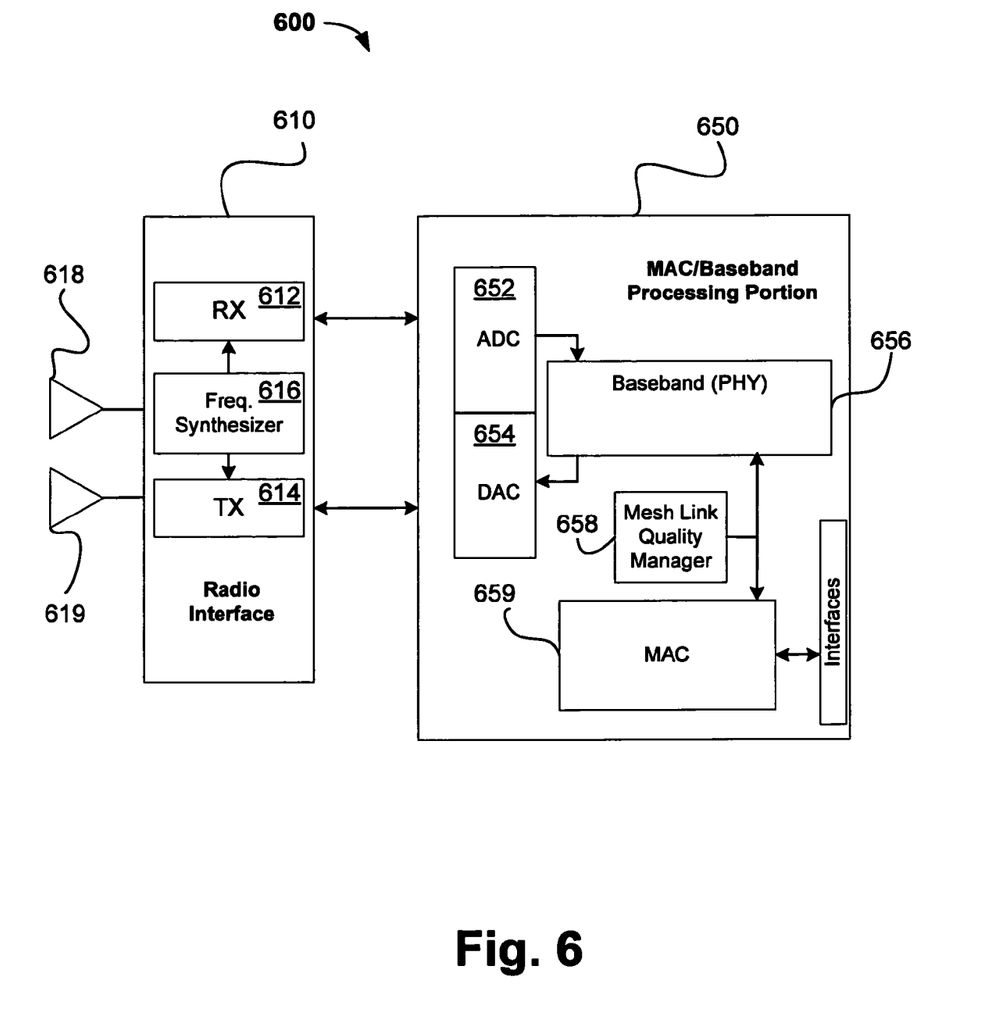
FIG. 6 is a block diagram showing an example wireless apparatus according to various aspects of the invention.

Referring to FIG. 6, an apparatus 600 for use in a wireless mesh network according to the various embodiments may include a processing circuit 650 including logic (e.g., circuitry, processor(s), software, or combination thereof) to control wireless mesh optimization as described in one or more of the embodiments above. In certain embodiments, apparatus 600 may generally include a radio frequency (RF) interface 610 and a baseband and MAC processor portion 650.

In one example embodiment, RF interface 610 may be any component or combination of components adapted to send and receive modulated signals (e.g., using OFDMA) although the inventive embodiments are not limited in this manner. RF interface 610 may include, for example, a receiver 612, a transmitter 614 and a frequency synthesizer 616. Interface 610 may also include bias controls, a crystal oscillator and/or one or more antennas 618, 619 if desired. Furthermore, RF interface 610 may alternatively or additionally use external voltage-controlled oscillators (VCOs), surface acoustic wave filters, intermediate frequency (IF) filters and/or radio frequency (RF) filters as desired. Various RF interface designs and their operation are known in the art and the description for configuration thereof is therefore omitted.

In some embodiments interface 610 may be configured to provide OTA link access which is compatible with one or more of the IEEE standards for WPANs, WLANs, WMANs or WWANs, although the embodiments are not limited in this respect.

Processing portion 650 may communicate/cooperate with RF interface 610 to process receive/transmit signals and may include, by way of example only, an analog-to-digital converter 652 for digitizing received signals, a digital-to-analog converter 654 for up converting signals for carrier wave transmission, and a baseband processor 656 for physical (PHY) link layer processing of respective receive/transmit signals. Processing portion 650 may also include or be comprised of a processing circuit 659 for media access control (MAC)/data link layer processing.

In certain embodiments of the present invention, a mesh quality link manager 658 may be included in processing portion 650 and which may function to track direct and backhaul link qualities for multi-hop paths, explicitly include or observe information elements in frames or packets regarding multi-hop link quality and/or to control transmit power to implicitly convey multi-hop link quality as described in any of the embodiments above. The functionality associated with mesh link quality manager 658 will depend on whether apparatus 600 is implemented as a base station, a mesh relay station or as a next generation subscriber station. In certain embodiments, mesh link manager 658 may also include functionality for a mesh routing manager to determine cost metrics and/or identify next hop nodes as described in the patent application U.S. patent application Ser. No. 11/318,206 filed on Dec. 23, 2005 and entitled "Routing in Wireless Mesh Networks" by Ozgur Oyman.

Alternatively or in addition, PHY circuit 656 or MAC processor 659 may share processing for certain of these functions or perform these processes independently. MAC and PHY processing may also be integrated into a single circuit if desired.

Apparatus 600 may be, for example, a wireless base station, access point (AP), a hybrid coordinator (HC), a wireless router and/or a network adaptor for electronic devices. Apparatus 600 could instead be a new generation subscriber station, NIC or network adapter for a client station capable of reading the mesh link quality information in packet 300 of FIG. 3. Accordingly, the previously described functions and/or specific configurations of apparatus 600 could be included or omitted as suitably desired.

Embodiments of apparatus 600 may be implemented using single input single output (SISO) architectures. However, as shown in FIG. 6, certain implementations may use multiple input multiple output (MIMO), multiple input single output (MISO) or single input multiple output (SIMO) architectures having multiple antennas (e.g., 618, 619) for transmission and/or reception. Further, embodiments of the invention may utilize multi-carrier code division multiplexing (MC-CDMA) multi-carrier direct sequence code division multiplexing (MC-DS-CDMA) for OTA link access or any other existing or future arising modulation or multiplexing scheme compatible with the features of the inventive embodiments.

The components and features of apparatus 600 may be implemented using any combination of discrete circuitry, application specific integrated circuits (ASICs), logic gates and/or single chip architectures. Further, the features of apparatus 600 may be implemented using microcontrollers, programmable logic arrays and/or microprocessors or any combination of the foregoing where suitably appropriate (collectively or individually referred to as "logic").

It should be appreciated that apparatus 600 represents only one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments of the present invention.

Unless contrary to physical possibility, the inventors envision: (i) the methods described herein may be performed in any sequence and/or in any combination; and (ii) the components of respective embodiments may be combined in any manner.

Although there have been described example embodiments of this novel invention, many variations and modifications are possible without departing from the scope of the invention. Accordingly the inventive embodiments are not limited by the specific disclosure above, but rather should be limited only by the scope of the appended claims and their legal equivalents.

The invention claimed is:

1. A method for communicating in a wireless mesh network, the method comprising:
    implicitly assisting a subscriber station of a first class to select a network station for association, the network station having a highest available throughput through the wireless mesh network, said implicitly assisting comprises controlling a transmit power of a wireless link between the subscriber station of the first class and a wireless node, said controlling based, at least in part, on one or more backhaul link qualities in the wireless mesh network; and
    sending frames to a subscriber station of a second class from the wireless node, the frames comprising a legacy portion in a format compatible with the subscriber station of the first class and an extended portion in a format not recognized by the subscriber station of the first class, the extended portion comprising explicit information regarding the one or more backhaul link qualities;
    wherein controlling the transmit power comprises reducing a transmit power below a normal transmit power for at least one of a plurality of frames sent to the subscriber station of the first class and resuming the normal transmit power for a remainder of the plurality of frames.

2. The method of claim 1 wherein the one or more backhaul link qualities comprise an end-to-end throughput quality of wireless links in a multi-hop path.

3. The method of claim 1 wherein the wireless mesh network utilizes protocols compatible with the Institute of Electrical and Electronic Engineers (IEEE) 802.16-2005 standard.

4. The method of claim 1 wherein controlling the transmit power comprises reducing the transmit power for one or more frames in proportion to a ratio of a total end-to-end link quality with a mobile station over a last hop link quality with the mobile station.

5. The method of claim 1 wherein the at least one of a plurality of frames includes at least one of a ranging, a preamble or an association frame sent to a mobile station.

6. The method of claim 1, wherein the wireless node is a relay station.

7. A wireless device comprising:
a processing circuit including logic to explicitly provide indicia of multi-hop wireless link qualities to a first class of mobile stations in a first mode, and to implicitly provide indicia of multi-hop wireless link qualities to a second class of mobile stations in a second mode, wherein said implicitly providing comprises adjusting a transmit power of a wireless link between the wireless device and a mobile station of the second class for at least part of a transmission to the mobile station of the second class, the indicia provided to the first class of mobile stations in one or more frames, the one or more frames comprising a legacy portion in a format compatible with the second class of mobile stations and an extended portion in a format not recognized by the second class of mobile stations, the extended portion comprising the indicia;
wherein said adjusting the transmit power comprises reducing a transmit power below a normal transmit power for at least one of a plurality of frames sent to the mobile station of the second class and resuming the normal transmit power for a remainder of the plurality of frames.

8. The wireless device of claim 7 wherein the indicia of multi-hop wireless link qualities pertains to a throughput between the wireless device and a wireless base station over one or more wireless backhaul links.

9. The wireless device of claim 7 wherein the logic to explicitly provide indicia of multi-hop link qualities comprises logic to include an information element (IE) in a portion of a physical layer (PHY) frame sent to the first class of mobile stations, wherein the IE pertains to one or more wireless backhaul link qualities of a multi-hop relay wireless mesh network.

10. The wireless device of claim 7 further comprising a radio frequency (RF) interface in communication with the processing circuit.

11. The wireless device of claim 10 wherein the RF interface includes at least two antennas and being adapted for multiple-input multiple-output (MIMO) communications.

12. The wireless device of claim 7 wherein the wireless device comprises a wireless mesh relay station and wherein the relay station is adapted to use protocols compatible with one or more Institute of Electrical and Electronic Engineers (IEEE) 802.11 or 802.16 standards.

13. The wireless device of claim 7 wherein in the second mode the transmit power of the at least part of the transmission sent to the second class of stations is adjusted to be substantially proportionate with a ratio of an end-to-end multi-hop link throughput over a last hop link throughput.

14. An article of manufacture comprising a tangible medium storing readable code that, when executed by a processing device, causes the processing device to:
implicitly assist a subscriber station of a first class to select a network station for association, the network station having a highest available throughput through a wireless mesh network, said implicitly assisting comprises controlling a transmit power of a wireless link between the subscriber station of the first class and a wireless node, said control based, at least in part, on one or more backhaul link qualities in a wireless mesh network; and
send frames to a subscriber station of a second class from the wireless node, the frames comprising a legacy portion in a format compatible with the subscriber station of the first class and an extended portion in a format not recognized by the subscriber station of the first class, the extended portion comprising explicit information regarding the one or more backhaul link qualities;
wherein controlling the transmit power comprises reducing a transmit power below a normal transmit power for at least one of a plurality of frames sent to the subscriber station of the first class and resuming the normal transmit power for a remainder of the plurality of frames.

15. The article of claim 14 further comprising machine readable code that, when executed by a processing device, causes the processing device to:
send multi-hop link quality information in a portion of physical layer (PHY) frame to assist a mobile device receiving the PHY frame to associate with a wireless mesh node have substantially a highest throughput available to a core network.

16. The article of claim 14 wherein the transmit power is controlled to be proportional to a ratio of a signal-to-noise ratio (SNR) of an end-to-end multi-hop path over a SNR of a last hop link.

17. The article of claim 14, wherein the wireless node is a relay station.

18. A wireless system comprising:
a processing circuit including logic to explicitly provide indicia of multi-hop wireless link qualities to a subscriber station of a first class, and to implicitly provide indicia of multi-hop wireless link qualities to a subscriber station of a second class, wherein said implicitly providing comprises adjusting a transmit power of a wireless link between a wireless node and the subscriber station of the second class, the indicia provided to the subscriber station of the first class in one or more frames, the one or more frames comprising a legacy portion in a format compatible with the subscriber station of the second class and an extended portion in a format not recognized by the subscriber station of the second class, the extended portion comprising the indicia;
a radio frequency (RF) interface communicatively coupled to the processing circuit; and
at least two antennas coupled to the RF interface for at least one of multiple-input or multiple-output (MIMO) communications;
wherein controlling the transmit power comprises reducing a transmit power below a normal transmit power for at least one of a plurality of frames sent to the subscriber station of the second class and resuming the normal transmit power for a remainder of the plurality of frames.

19. The system of claim 18 wherein adjusting the transmit power to a subscriber station comprises reducing a transmit power by a fraction of a ratio of an end-to-end multi-hop wireless link throughput over a last hop wireless link throughput.

20. The system of claim 18 wherein the system comprises a wireless mesh relay station and wherein the subscriber station of the first class is capable of reading a frame format which includes information elements pertaining to a multi-hop link quality and wherein the subscriber station of the second class is not capable of reading the frame format.

* * * * *